(12) United States Patent
Oh

(10) Patent No.: US 11,035,311 B2
(45) Date of Patent: Jun. 15, 2021

(54) METHOD FOR CONTROLLING AIR-FUEL RATIO OF VEHICLE HAVING VARIABLE VALVE DURATION APPARATUS AND ACTIVE PURGE SYSTEM

(71) Applicants: HYUNDAI MOTOR COMPANY, Seoul (KR); KIA MOTORS CORPORATION, Seoul (KR)

(72) Inventor: Young-Kyu Oh, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/673,216

(22) Filed: Nov. 4, 2019

(65) Prior Publication Data

US 2020/0191085 A1 Jun. 18, 2020

(30) Foreign Application Priority Data

Dec. 17, 2018 (KR) .................... 10-2018-0163000

(51) Int. Cl.
*F02D 41/18* (2006.01)
*F02D 41/00* (2006.01)
(Continued)

(52) U.S. Cl.
CPC ............. *F02D 41/182* (2013.01); *F02D 9/08* (2013.01); *F02D 13/0203* (2013.01);
(Continued)

(58) Field of Classification Search
CPC ... F02D 13/0203–0249; F02D 13/0261; F02D 41/006; F02D 41/0042;
(Continued)

(56) References Cited

U.S. PATENT DOCUMENTS 5,363,832 A * 11/1994 Suzumura ........... F02D 41/0045
123/478
5,426,938 A * 6/1995 Ogawa .................... F02D 37/02
60/285
(Continued)

FOREIGN PATENT DOCUMENTS

CN 107476892 A * 12/2017 ......... F02D 41/0045
JP 06093901 A * 4/1994
(Continued)

*Primary Examiner* — John M Zaleskas
(74) *Attorney, Agent, or Firm* — Brinks Gilson & Lione

(57) ABSTRACT

A method for controlling the air-fuel ratio of a vehicle includes: calculating the air amount charged in a cylinder of an engine by using a fresh air amount, a residual air amount remaining inside the cylinder of the engine, and a backflow gas amount flowing back into the cylinder upon the valve overlap of an intake vale and an exhaust valve of the engine, correcting it with the purge gas flow rate supplied to an intake manifold of the engine when the active purge system is operated, calculating the final fuel amount by correcting the fuel amount injected by a fuel injection device with the amount of the fuel component contained in the purge gas when the active purge system is operated, and controlling the air-fuel ratio based on the final air amount and the final fuel amount.

12 Claims, 15 Drawing Sheets

(51) Int. Cl.
  *F02M 35/10* (2006.01)
  *F02M 25/08* (2006.01)
  *F02D 13/02* (2006.01)
  *F02M 26/47* (2016.01)
  *F02D 9/08* (2006.01)
  *F02D 41/14* (2006.01)

(52) U.S. Cl.
  CPC ..... *F02D 13/0226* (2013.01); *F02D 13/0246* (2013.01); *F02D 13/0261* (2013.01); *F02D 41/0042* (2013.01); *F02D 41/0045* (2013.01); *F02D 41/0062* (2013.01); *F02M 25/0836* (2013.01); *F02M 26/47* (2016.02); *F02M 35/10222* (2013.01); *F02D 41/1446* (2013.01); *F02D 41/1448* (2013.01); *F02D 2200/0402* (2013.01); *F02D 2200/0406* (2013.01)

(58) Field of Classification Search
  CPC ............. F02D 41/0045; F02D 41/0062; F02D 2041/001; F02M 26/01
  See application file for complete search history.

(56) References Cited

U.S. PATENT DOCUMENTS

| | | | | |
|---|---|---|---|---|
| 6,247,457 | B1* | 6/2001 | Mallebrein | F02D 41/1401 123/520 |
| 2001/0042529 | A1* | 11/2001 | Kawasaki | F02D 41/0002 123/90.15 |
| 2003/0005916 | A1* | 1/2003 | Osanai | F02D 41/1458 123/698 |
| 2003/0093212 | A1* | 5/2003 | Kotwicki | F02D 41/32 701/102 |
| 2003/0097214 | A1* | 5/2003 | Gross | F02D 41/0062 701/103 |
| 2003/0105575 | A1* | 6/2003 | Haskara | G05B 13/0255 701/101 |
| 2004/0015287 | A1* | 1/2004 | Ilzuka | F02D 35/023 701/102 |
| 2004/0139949 | A1* | 7/2004 | Koseki | F02D 35/025 123/568.14 |
| 2004/0230364 | A1* | 11/2004 | Uchida | F02D 41/0062 701/101 |
| 2005/0066947 | A1* | 3/2005 | Barba | F02D 13/0261 123/568.16 |
| 2006/0031000 | A1* | 2/2006 | Amano | F02M 25/0818 701/114 |
| 2007/0089721 | A1* | 4/2007 | Amano | F02D 41/0045 123/698 |
| 2007/0137622 | A1* | 6/2007 | Koyama | F02M 25/089 123/520 |
| 2007/0175455 | A1* | 8/2007 | Amano | F02D 41/0045 123/520 |
| 2007/0277789 | A1* | 12/2007 | Ishikawa | F02D 41/0045 123/520 |
| 2008/0312808 | A1* | 12/2008 | Mino | F02D 41/0045 701/104 |
| 2009/0070001 | A1* | 3/2009 | Takakura | F02N 11/0829 701/102 |
| 2009/0070005 | A1* | 3/2009 | Kim | F02D 41/0045 701/103 |
| 2009/0183500 | A1* | 7/2009 | Uchida | F02D 41/0032 60/295 |
| 2009/0235728 | A1* | 9/2009 | Sinnamon | G01M 15/106 73/118.02 |
| 2010/0235072 | A1* | 9/2010 | Okazaki | F02D 41/0042 701/106 |
| 2013/0146006 | A1 | 6/2013 | Kim et al. | |
| 2013/0213366 | A1* | 8/2013 | Weigl | F02M 25/089 123/520 |
| 2013/0245922 | A1* | 9/2013 | Irie | F02D 41/0072 701/108 |
| 2014/0000572 | A1* | 1/2014 | Kosaka | F02D 13/0265 123/568.14 |
| 2014/0007854 | A1* | 1/2014 | Kosaka | F02D 13/0265 123/568.14 |
| 2014/0007855 | A1* | 1/2014 | Kosaka | F02D 41/0062 123/568.21 |
| 2014/0020656 | A1* | 1/2014 | Kosaka | F02M 26/01 123/348 |
| 2014/0172278 | A1* | 6/2014 | Kosaka | F02D 41/0062 701/108 |
| 2014/0230780 | A1* | 8/2014 | Larimore | F02D 41/0062 123/319 |
| 2014/0338636 | A1* | 11/2014 | Irie | F02D 41/2454 123/436 |
| 2015/0051811 | A1* | 2/2015 | Song | F02D 41/04 701/104 |
| 2015/0330326 | A1* | 11/2015 | Shaver | F02D 13/0265 123/445 |
| 2016/0237926 | A1* | 8/2016 | Tanaka | F02D 41/0235 |
| 2017/0159588 | A1* | 6/2017 | Honjo | B01D 53/0454 |
| 2018/0058350 | A1* | 3/2018 | Zhu | F02M 26/01 |
| 2018/0100451 | A1* | 4/2018 | Millich | G01F 22/02 |
| 2018/0195451 | A1* | 7/2018 | Matohara | F02D 41/0045 |
| 2018/0223775 | A1* | 8/2018 | Wodausch | F02D 41/0087 |
| 2018/0372030 | A1* | 12/2018 | Achleitner | F02M 25/089 |
| 2019/0017449 | A1* | 1/2019 | Millich | F02D 41/0062 |
| 2019/0085777 | A1* | 3/2019 | Won | F02D 41/0062 |
| 2019/0101082 | A1* | 4/2019 | Sanuma | F02M 25/0836 |
| 2019/0271271 | A1* | 9/2019 | Nakagawa | F02M 25/0836 |
| 2019/0301381 | A1* | 10/2019 | Hatano | F02D 41/0045 |
| 2019/0331036 | A1* | 10/2019 | Asanuma | F02D 41/0045 |
| 2019/0353112 | A1* | 11/2019 | Kim | F02D 41/0042 |
| 2020/0025156 | A1* | 1/2020 | Mizushima | F02M 25/0836 |
| 2020/0141359 | A1* | 5/2020 | Nakagawa | F02M 69/34 |
| 2020/0173383 | A1* | 6/2020 | Oh | F02M 26/17 |
| 2020/0182169 | A1* | 6/2020 | Kim | F02D 41/0045 |
| 2020/0191072 | A1* | 6/2020 | Ahn | F02M 35/10222 |
| 2020/0271064 | A1* | 8/2020 | Ahn | F02D 41/0042 |

FOREIGN PATENT DOCUMENTS

| | | | | |
|---|---|---|---|---|
| JP | 07034921 | A | * | 2/1995 |
| JP | 07305646 | A | * | 11/1995 |
| JP | 09014062 | A | * | 1/1997 |
| KR | 10-0290337 | B1 | | 3/2001 |
| KR | 10-1326818 | B1 | | 11/2013 |
| WO | WO-2006037717 | A1 | * | 4/2006 ......... F02D 41/0045 |

* cited by examiner

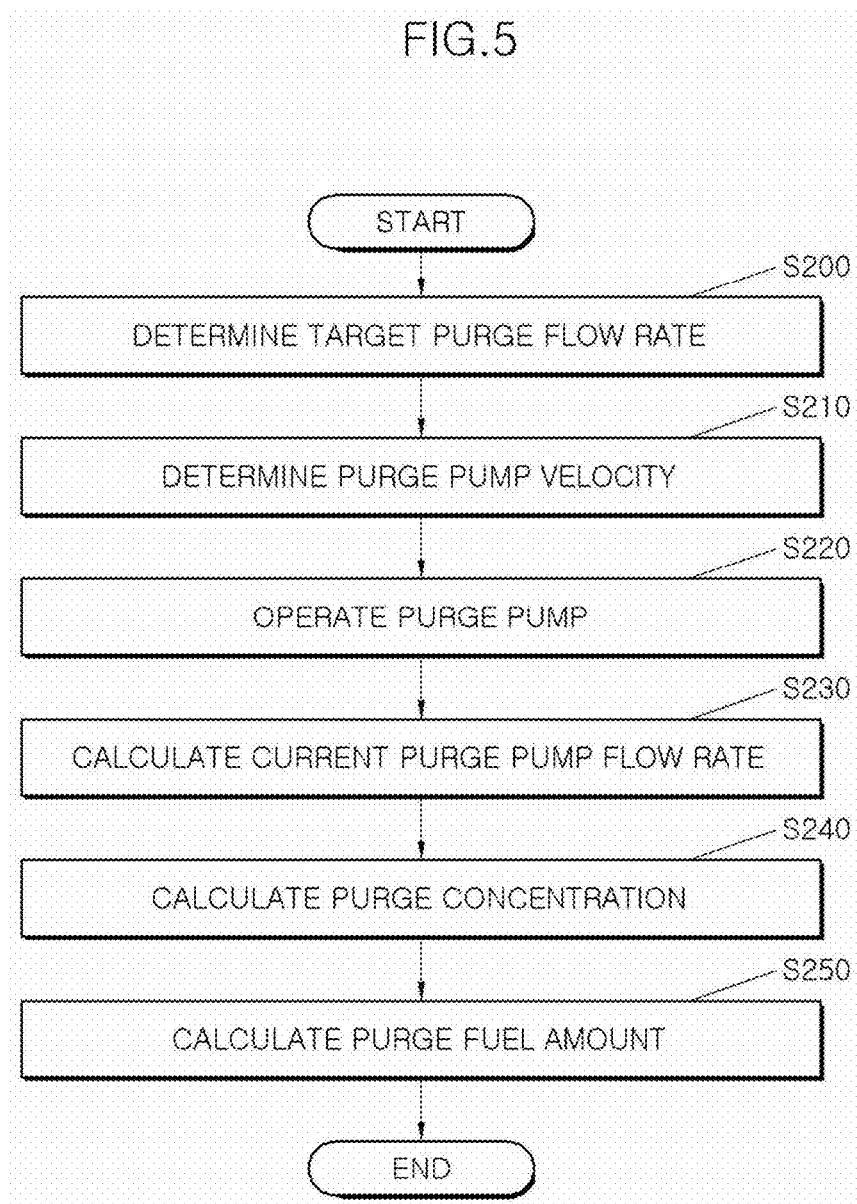

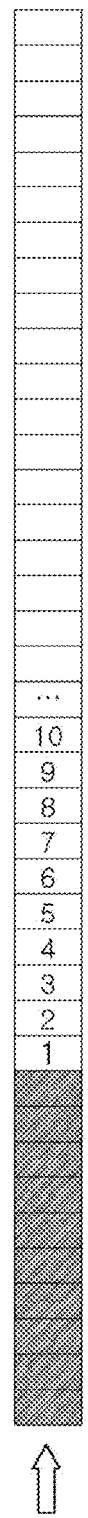

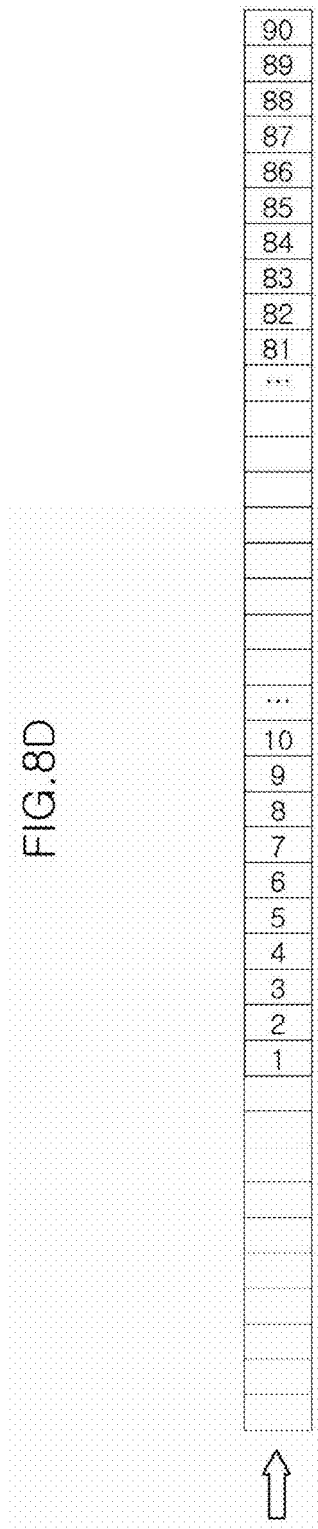

METHOD FOR CONTROLLING AIR-FUEL RATIO OF VEHICLE HAVING VARIABLE VALVE DURATION APPARATUS AND ACTIVE PURGE SYSTEM

CROSS-REFERENCE TO RELATED APPLICATION

This application claims priority to and the benefit of Korean Patent Application No. 10-2018-0163000, filed on Dec. 17, 2018, the entire contents of which are incorporated herein by reference.

FIELD

The present disclosure relates to a method for controlling an air-fuel ratio of a vehicle, and more particularly, to a method for controlling an air-fuel ratio by reflecting the case where the air amount and the amount of fuel are changed by the driving of an active purge system in a vehicle having a variable valve duration apparatus and an active purge system.

BACKGROUND

The statements in this section merely provide background information related to the present disclosure and may not constitute prior art.

Conventionally, as an apparatus for changing a valve duration, a Continuously Variable Valve Lift (CVVL) technique has been developed in which a valve is implemented to operate with a different lift according to the RPM of an engine, but in such a CVVL system, the valve duration is variable but the valve lift is changed simultaneously, thereby reducing the degree of freedom of control.

For solving such a problem, a Continuously Variable Valve Duration Apparatus (CVVD) as disclosed in Korean Patent 10-1326818 (Nov. 11, 2013) was developed. In the case of the CVVD technique, as illustrated in FIG. 3, the valve duration may effectively vary without changing the valve lift. In addition, it is possible to independently control the opening/closing timing of the valve, thereby setting an optimum opening/closing timing of the valve.

Meanwhile, the fuel stored in a fuel tank of the vehicle is evaporated according to the flow and the internal temperature in the fuel tank to generate a fuel evaporation gas. When such a fuel evaporation gas is leaked into the atmosphere, it causes an environmental pollution problem. In order to prevent this, as in the technology disclosed in Korean Patent 10-0290337 (Oct. 24, 2001), a purge system for collecting the evaporation gas into a canister and flowing it into an intake system of the engine by using the intake air negative pressure to re-combust is currently applied.

In the case of the conventional purge system as in the Korean Patent 10-0290337 (Oct. 24, 2001), in particular, in the case of an engine equipped with a turbocharger, we have discovered that it is difficult to generate a negative pressure at the front end of the intake valve of the engine, such that it is difficult to apply the purge system using the conventional intake negative pressure.

The contents described in BACKGROUND are to help the understanding of the background of the present disclosure, and may include what is not previously known to those skilled in the art to which the present disclosure pertains.

SUMMARY

Accurately calculating the intake air amount and the supplied fuel amount of an engine of a vehicle is desired for improving the performance and fuel efficiency of the engine. In addition, it is also important to accurately determine the component of the exhaust gas. If the intake air amount of the engine is miscalculated to be greater than the actual value, the fuel corresponding thereto is injected, thereby deteriorating fuel efficiency and emitting harmful gases (CO, HC). In addition, conversely, if the intake air amount of the engine is miscalculated to be smaller than the actual value, the fuel corresponding thereto is injected relatively less, thereby undermining the output performance of the engine, and emitting harmful gas (NOx).

However, in the case of a vehicle to which an active purge system (APS) is applied, when the purge system is operated, the gas extruded from a purge pump is supplied to an intake manifold, the purge gas rich in fuel component flows into the idle state, or conversely, when lean air flows therein, a too lean or rich combustion atmosphere is generated, such that it may cause the phenomenon of stopping the engine.

FIG. 11 illustrates such a phenomenon. When the purge pump operates, the flow of the purge gas having a predetermined concentration (HC concentration) occurs, and after a certain time has elapsed, the purge gas reaches the intake manifold along the purge line ('①' in FIG. 11). In this case, the lambda value measured by a lambda sensor is changed by the fuel component (HC) contained in the purge gas, and as a result, an Engine Control Unit (ECU) corrects the injected fuel amount according to the measured lambda value for the air-fuel ratio control. In this procedure, the deviation of the lambda value greatly occurs, and therefore, the combustion procedure during the correction of the fuel amount becomes very unstable ('③' in FIG. 11).

As described above, we have found that in order to avoid undesired the engine stop and to secure the startability, it is desired to accurately calculate the air amount and the fuel amount when the active purge system drives to perform an accurate air-fuel ratio control. In particular, in a vehicle adopting a variable valve duration apparatus, it is desired to consider not only the fresh air amount but also the backflow gas amount upon the overlap of the valve in calculating the air amount, such that the air amount and the fuel amount is calculated more accurately.

The present disclosure provides a method for appropriately controlling the air-fuel ratio by accurately calculating the air amount and the fuel amount in the vehicle adopting a variable valve duration apparatus and an active purge system.

The method for controlling the air-fuel ratio of a vehicle, having an active purge system for purging a fuel evaporation gas by using a purge pump and a variable valve duration apparatus, includes: calculating, by a controller, an air amount charged in a cylinder of an engine based on a fresh air amount flowed into from the outside through a throttle valve of the engine, a residual air amount remaining inside the cylinder of the engine upon opening of an intake valve of the engine, and a backflow gas amount flowing back into the cylinder, wherein the backflow gas amount is calculated based on a valve duration controlled by the variable valve duration apparatus and a valve overlap of the intake vale and an exhaust valve of the engine; calculating, by the controller, a purge gas flow rate of purge gas supplied to an intake manifold of the engine when the active purge system is operated; calculating, by the controller, a final air amount by correcting the calculated air amount charged in the cylinder with the calculated purge gas flow rate; calculating, by the controller, an amount of a fuel component contained in the purge gas when the active purge system is operated; calculating, by the controller, a final fuel amount by correcting a fuel amount injected by a fuel injection device with the calculated amount of the fuel component contained in the purge gas; and controlling, by the controller, an air-fuel ratio of a mixture in order to satisfy a target air-fuel ratio based on the final air amount and the final fuel amount.

At this time, the purge gas flow rate is calculated by using revolutions per minute (RPM) of the purge pump and a pressure difference at a first end and a second end of the purge pump.

The calculating the amount of the fuel component contained in the purge gas includes: calculating a concentration of the purge gas by using the RPM of the purge pump and the pressure at a rear end of the purge pump; calculating a density of the fuel component in the purge gas by using the calculated purge gas concentration, and calculating a mass of the fuel component contained in the purge gas by using the density of the fuel component and the purge gas flow rate.

In order to calculate the purge concentration more accurately, the calculating the purge concentration is performed when a purge valve for opening and closing a purge passage has been closed.

In order to reflect the influence of the altitude and the temperature at the point where a vehicle is positioned, the calculating the amount of the fuel component contained in the purge gas further includes compensating the calculated density of the fuel component according to the external air temperature and the altitude of a vehicle.

In order to accurately calculate the time point at which the purge gas flows into an intake manifold and the purge concentration at this time, the concentration of the purge gas flowed into an intake system may be determined by using a diffusion/delay model of the purge gas until being discharged by the purge pump, and flowing into the intake system of the engine through a purge passage.

In one form, in calculating the air amount charged in the cylinder, the backflow gas amount is a value obtained by correcting a basic backflow gas amount determined based on the exhaust pressure, the intake pressure, the exhaust temperature, and the valve overlap period in the valve overlap section based on the valve duration changed by the operation of the variable valve duration apparatus.

In another form, when the basic backflow gas amount is corrected, the basic backflow gas amount is corrected at a certain rate by using the valve profile determined based on the Most Opening Position (MOP) and the valve closing of the intake valve or the exhaust valve controlled by the variable valve duration apparatus.

In other form, when the basic backflow gas amount is corrected, the basic backflow gas amount is corrected at a certain rate by using the valve profile determined based on the Most Opening Position (MOP) and the valve opening of the intake valve or the exhaust valve controlled by the variable valve duration apparatus.

In still other form, when the basic backflow gas amount is corrected, the basic backflow gas amount is corrected at a certain rate by using the valve profile determined based on the opening and the closing of the intake valve or the exhaust valve controlled by the variable valve duration apparatus.

As an exemplary form of the present disclosure, when the basic backflow gas amount is corrected, the basic backflow gas amount is corrected at a certain rate by using the valve profile determined based on the valve duration and the Most Opening Position (MOP) of the intake valve or the exhaust valve controlled by the variable valve duration apparatus.

In one aspect of the present disclosure, the basic backflow gas amount is corrected at a certain rate by using the valve profile determined by a function of the valve duration of the intake valve or the exhaust valve controlled by the variable valve duration apparatus.

In the vehicle equipped with an exhaust gas recirculation system (EGR), the final air amount is calculated by correcting the air amount corrected by the flow rate of the purge gas with the flow rate of the exhaust gas recirculated through an exhaust gas recirculation system (EGR) in order to reflect the EGR amount to the air amount.

According to the present disclosure, when the evaporation gas is purged by the active purge system, it is possible to accurately calculate the fuel amount additionally supplied by the purge gas, and to accurately calculate the fuel amount supplied to the engine at the present time by using it, thereby controlling the air-fuel ratio appropriately.

In addition, according to the present disclosure, it is possible to accurately calculate the air amount supplied to the engine at the present time considering the fresh air amount, the residual air amount, and the backflow air amount when the valve duration is changed by the variable valve duration apparatus and the purge gas flow rate supplied during the active purge operation, thereby controlling the air-fuel ratio appropriately.

In addition, according to the present disclosure, when the evaporation gas is purged by the active purge system, it is possible to accurately estimate the concentration component of the purge gas supplied to the intake manifold at a predetermining time point by reflecting the diffusion and the supply delay of the purge gas flowing along the purge passage. Therefore, it is possible to accurately control the air-fuel ratio considering it.

Therefore, according to the present disclosure, it is possible to effectively prevent the phenomena of the engine oscillation fault, the idle instability, the engine stall, and the like caused by the inflow of the purge gas.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a flowchart illustrating the method for calculating the fuel component amount (purge fuel amount) and the purge gas flow rate in the purge gas when an active purge system is driven, in the method for controlling the air-fuel ratio of the vehicle;

FIGS. 8A to 8D are diagrams for explaining a method for calculating the purge gas concentration flowing into an intake manifold by using a diffusion/delay model of the purge gas;

Figure 1:
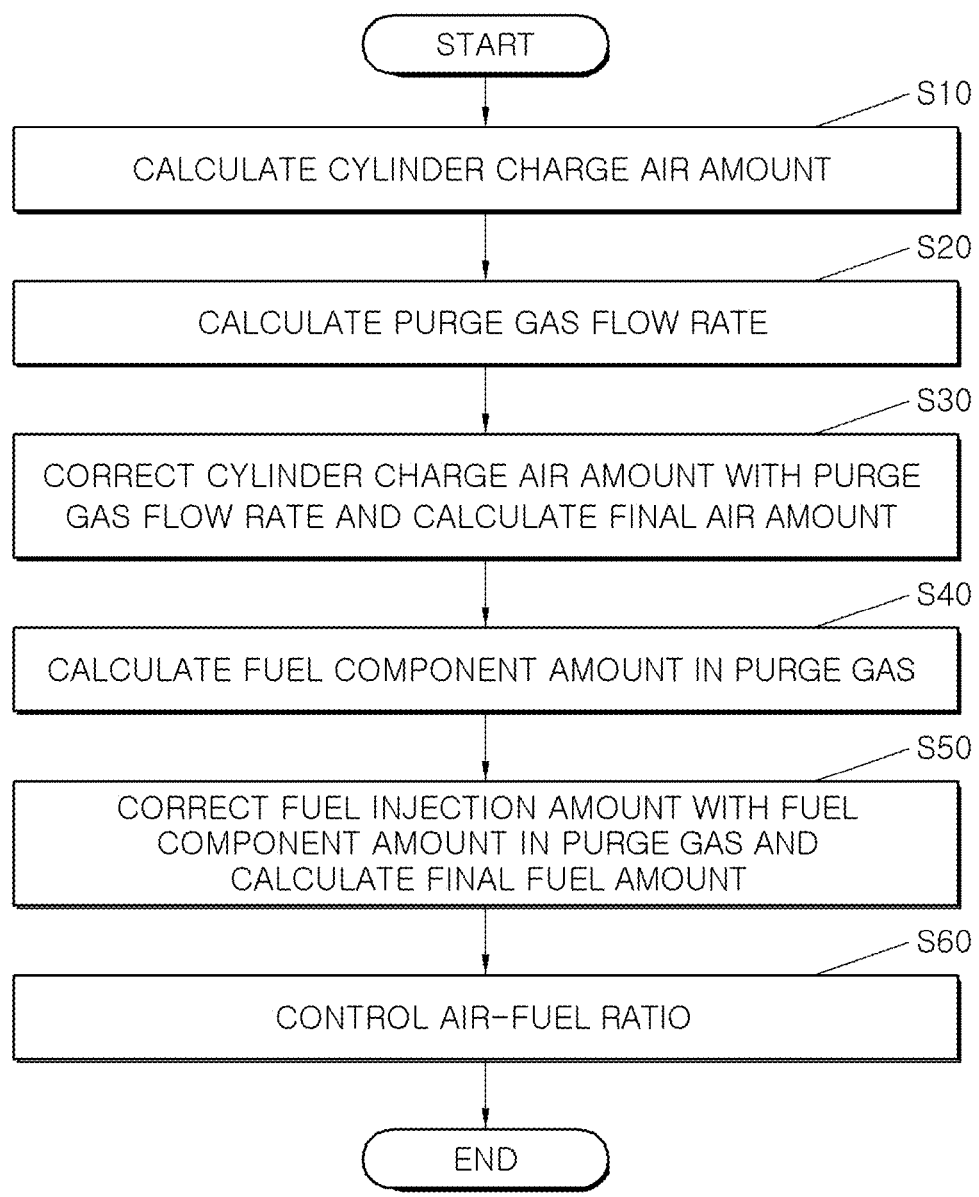
FIG. 1 is a flowchart illustrating a method for controlling an air-fuel ratio of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a purge concentration calculation control method and a fuel amount control method using the same will be described in detail with reference to the accompanying drawings. However, a detailed description of known functions and configurations that may unnecessarily obscure the subject matter of the present disclosure will be omitted.

First, a variable valve duration apparatus and an active purge system of a vehicle to which a method for controlling the air-fuel ratio according to the present disclosure may be applied will be described with reference to FIGS. 9 and 10.

Figure 9:
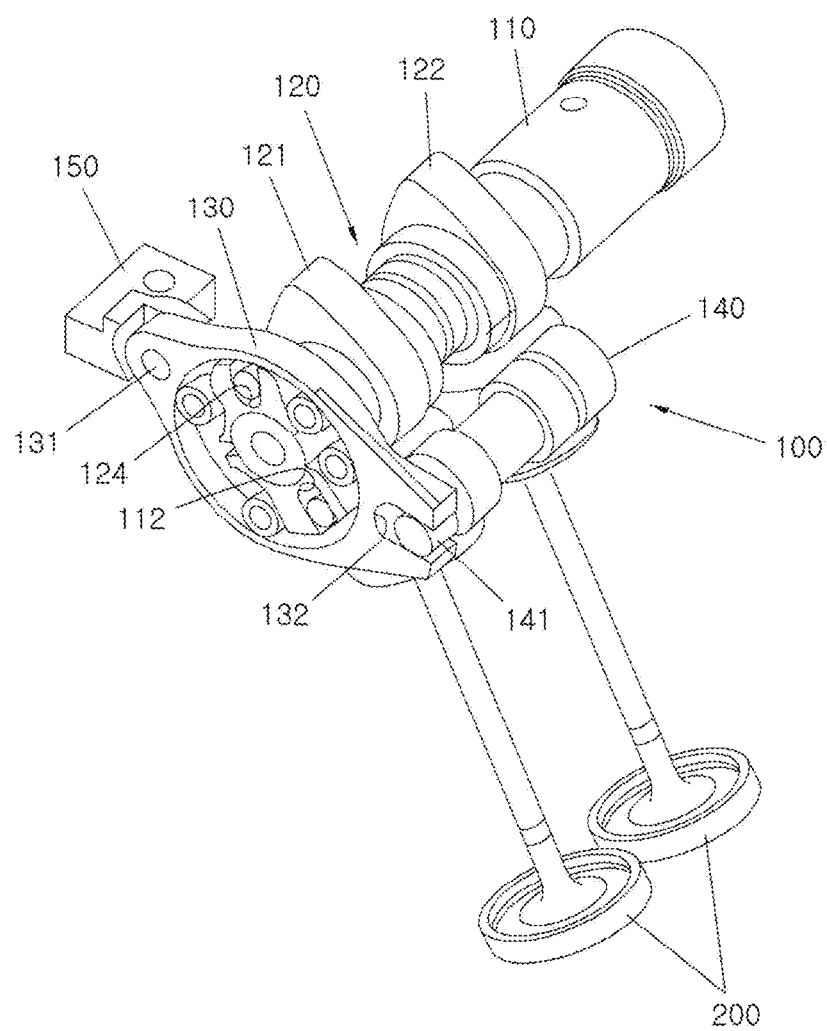
FIG. 9 is a schematic configuration diagram of an example of the variable valve duration apparatus to which the method for controlling the air-fuel ratio according to the present disclosure may be applied.

FIG. 9 is a schematic configuration diagram of an example of a variable valve duration apparatus to which a method for controlling the air-fuel ratio according to the present disclosure may be applied.

A variable valve duration apparatus 100 includes a camshaft 110 having a camshaft slot 112 formed thereon, and a cam part 120 provided on the camshaft 110 so that the relative phase is variable, having cams 121, 122 and a cam slot 124 formed thereon, and having the rotation center thereof coincide with the rotation center of the camshaft 110.

Then, the variable valve duration apparatus 100 has a roller guide part 130, and the roller guide part 130 is connected to the camshaft slot 112 and the cam slot 124 therein. One end of the roller guide part 130 is coupled to the engine through a hinge 131 and a bracket 150, and a control slot 132 is formed at the other end thereof. In addition, the variable valve duration apparatus 100 has a control shaft 140 provided in parallel with the camshaft 110 and having a control pin 141 inserted into the control slot 132 eccentrically formed at the center thereof.

The rotation center of the roller guide part 130 is parallel to the rotation center of the camshaft 110, and the rotation center thereof may be moved by using an actuator, a motor, or the like controlled by a control unit not illustrated. By generating a difference between the rotation center of the roller guide part 130 and the rotation center of the camshaft 110, the relative phase angle between the camshaft slot 112 and the cam slot 124 may be varied, such that the relative RPMs of the camshaft 110 and the cam 120 are varied, and therefore, the elapsed time between the opening and closing times of the valve lift may vary the valve duration.

In addition, the variable valve duration apparatus 100 may vary the valve duration by fixing the valve opening or valve closing according to the design of the position of the hinge 131 and changing the remaining position, and may also vary the valve duration by fixing the Most Opening Position (MOP) and varying the valve opening and the valve closing. The valve timing and the valve duration may be easily and variably controlled by combining the variable valve duration apparatus 100 and the conventional variable valve timing apparatus.

The variable valve duration apparatus 100 illustrated in FIG. 9 is merely an example of the variable valve duration apparatus to which the control method according to the exemplary form of the present disclosure may be applied, and the variable valve duration apparatus to which the control method according to the present disclosure may be applied is not limited to the structure of the apparatus illustrated in FIG. 9.

Figure 10:
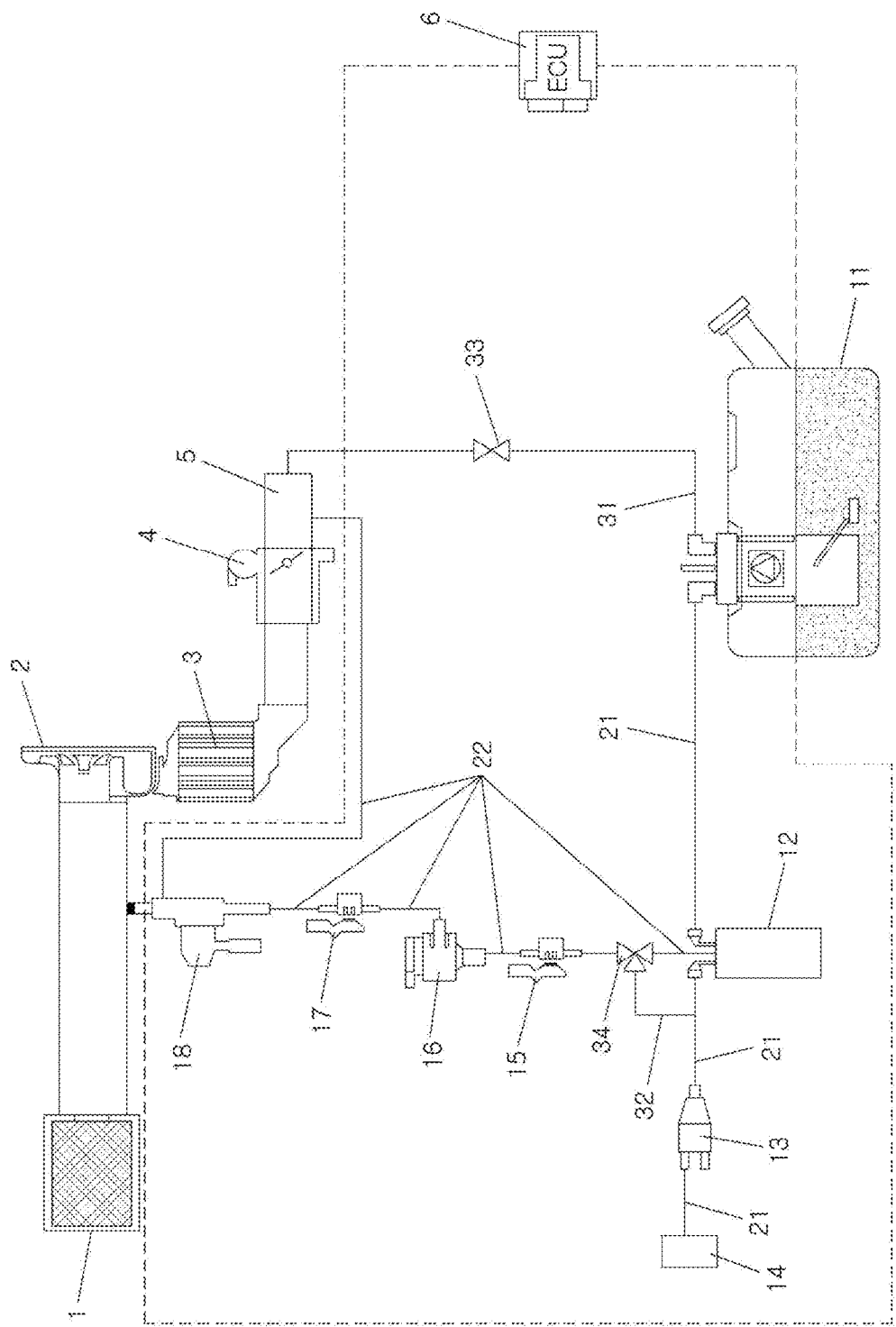
FIG. 10 is a configuration diagram of the active purge system to which the method for controlling the air-fuel ratio according to the present disclosure may be applied.
Figure 11:
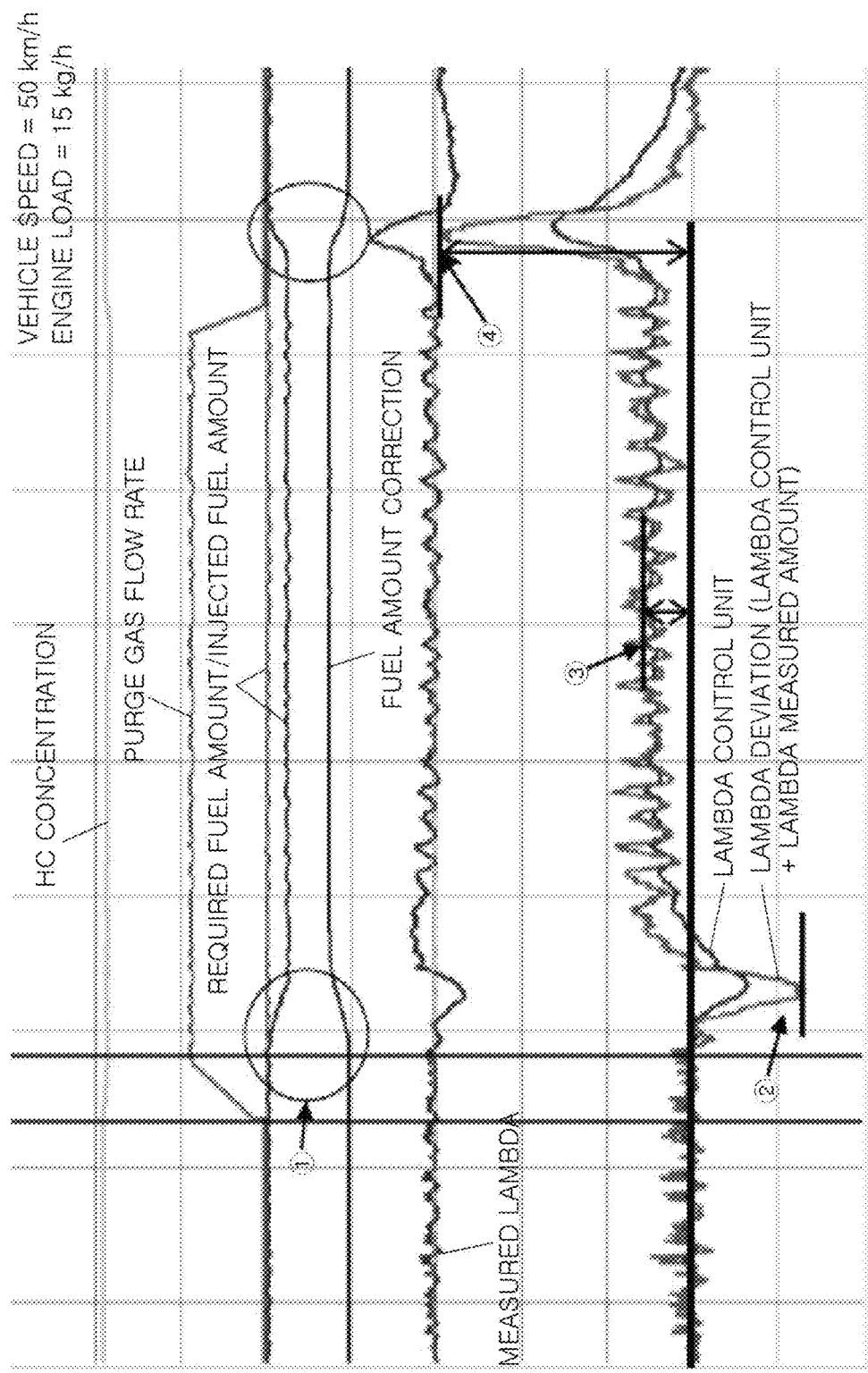
FIG. 11 is a signal diagram for illustrating the instability of a lambda control according to the flow-in of the purge air when the active purge system is operated.

FIG. 10 is a configuration diagram of an active purge system to which the method for controlling the air-fuel ratio according to the present disclosure may be applied.

Referring to FIG. 10, an active purge system of a vehicle, to which the method for controlling the air-fuel ratio according to the present disclosure may be applied, includes: a fuel tank 11, a canister 12, a canister vent valve 13, a canister filter 14, a pressure and temperature sensor 15, a purge pump 16, a pressure sensor 17, a purge valve 18, and the like.

In the active purge system, the fuel evaporation gas formed by evaporating the fuel stored in the fuel tank 11 is collected in the canister 12. The fuel evaporation gas collected in the canister 12 is extruded by the purge pump 16, and the fuel evaporation gas (purge gas) extruded by the purge pump 16 is supplied to an intake manifold 5 along the purge passage 22. The flow rate of the purge gas supplied at this time is adjusted by the RPM of the purge pump 16 and the opening of the purge valve 18. The pressure sensors 15, 17 for measuring the pressure of the purge gas at the front end and the rear end of the purge pump 16 are provided between the purge pump 16 and the canister 12, and between the purge pump 16 and the purge valve 18.

In FIG. 10, a reference numeral 6 refers to an Engine Control Unit (ECU), and the air-fuel ratio control according to the present disclosure is performed by the engine control unit 6.

The active purge system illustrated in FIG. 10 is merely one example to which the control method may be applied, and the active purge system to which the control method according to the present disclosure may be applied is not limited to the structure of the apparatus illustrated in FIG. 10.

FIG. 1 is a flowchart illustrating a method for controlling the air-fuel ratio according to one form of the present disclosure.

In order to control the air-fuel ratio, it is desired to accurately calculate the air amount and the fuel amount flowing into the engine currently.

For this purpose, in step S10, the engine control unit 6 first calculates the air amount to be filled inside the cylinder of an engine upon the intake stroke when the active purge system is not driven. The air amount filled inside the cylinder of the engine at this time becomes the sum of the fresh air amount flowing into through a throttle valve 4, the residual air amount remaining inside the cylinder of the engine upon the opening of an intake valve, and the gas amount flowing back into the cylinder upon the valve overlap of the intake valve and the exhaust valve. A detailed method for calculating the air amount will be again described in detail later.

Meanwhile, when the active purge system is driven, the purge gas extruded by the purge pump 16 flows into the intake manifold 5 of the engine along the purge passage 22. Therefore, the air amount flowing into the engine increases by the purge gas flow rate.

Therefore, in order to accurately calculate the air amount, the engine control unit 6 calculates the purge gas flow rate in step S20 in FIG. 1. A detailed method for calculating the purge gas flow rate will be again described in detail later. Then, the engine control unit 6, in step S30, calculates the final air amount by summing the calculated purge gas flow rate with the cylinder charge air amount calculated in the step S10.

Meanwhile, as the active purge system is driven, the purge gas extruded by the purge pump 16 flows into the intake manifold 5 of the engine along the purge passage 22, the fuel amount flowing into the cylinder increases by the amount of the fuel component (HC) contained in the purge gas.

Therefore, in order to accurately calculate the air amount, the engine control unit 6 calculates the amount of fuel component HC contained in the purge gas in step S40. A detailed method for calculating the air amount will be again described in detail later. Then, in step S50, the engine control unit 6 calculates the final fuel amount by summing the amount of the fuel component contained in the purge gas calculated in the step S40 with the fuel amount injected by a fuel injection device.

Then, the engine control unit 6 determines the current air-fuel ratio of the mixture supplied to the cylinder of the engine based on the final air amount calculated in the step S30 and the final fuel amount calculated in the step S50, and in order to achieve the target optimum air-fuel ratio based on the above, performs the air-fuel ratio control for controlling the throttle valve 4, the fuel injection device, and the like of the engine in step S60.

Meanwhile, as a means for reducing the exhaust gas, an exhaust gas recirculation system (EGR) for flowing a part of the exhaust gas discharged to the exhaust system back into the intake manifold 5 may be adopted. In this case, in order to accurately calculate the air amount flowing into the engine, it is desired to consider the amount of the recirculating gas flowing into the intake manifold 5 through the exhaust gas recirculation system (EGR) in addition to the purge gas flowed into by the active purge system. Therefore, when the exhaust gas recirculation system is operated, the engine control unit 6 calculates the final air amount by correcting the final air amount calculated in the S30 with the flow rate of the exhaust gas recirculated through the exhaust gas recirculation system (EGR). That is, the final air amount is obtained by summing the final air amount calculated in the S30 and the flow rate of the exhaust gas recirculated through the exhaust gas recirculation system (EGR). Herein, the flow rate of the exhaust gas recirculated through the exhaust gas recirculation system (EGR) may be calculated by using the opening of the EGR valve used in the exhaust gas recirculation system, the exhaust pressure at the outlet portion of the exhaust gas recirculation system (EGR).

Hereinafter, a method for calculating the air amount filled inside the cylinder of the engine upon the intake stroke when the active purge system is not operated, which is executed in the S10 of FIG. 1, will be described in more detail.

Figure 3:
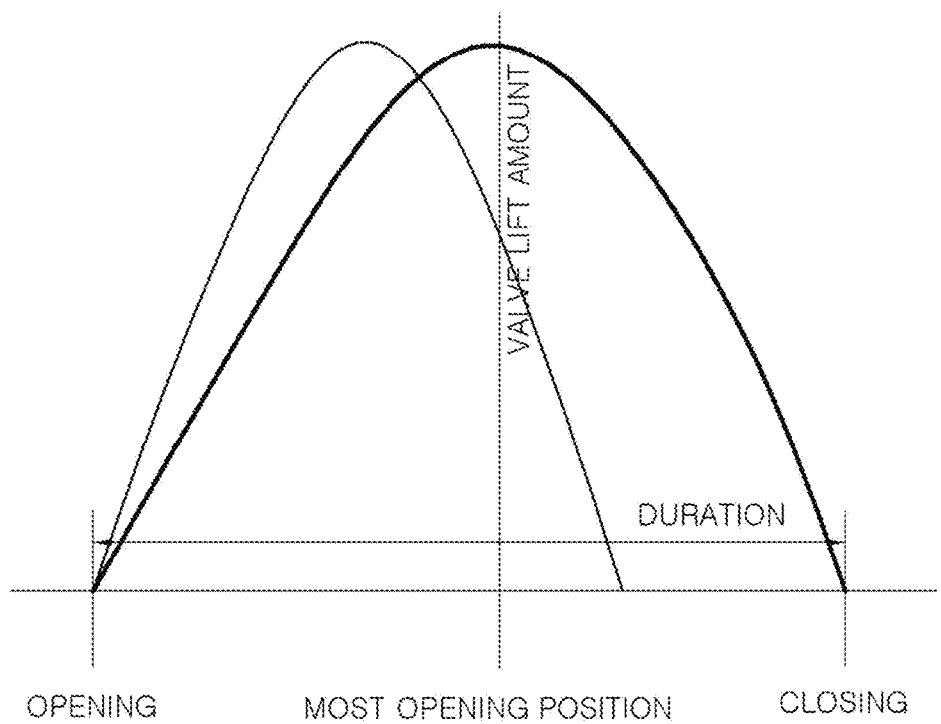
FIG. 3 is a diagram illustrating a change in the valve duration changed by a variable valve duration apparatus and the valve profile at that time.

In the case of the variable valve duration technology, the valve duration may be effectively varied without changing the valve lift as illustrated in FIG. 3. In addition, by independently controlling the opening/closing of the valve, the optimum valve opening/closing may be set. However, when the variable valve duration apparatus is applied, the profile of the valve is changed as illustrated in FIGS. 4A and 4B.

Figure 4A:
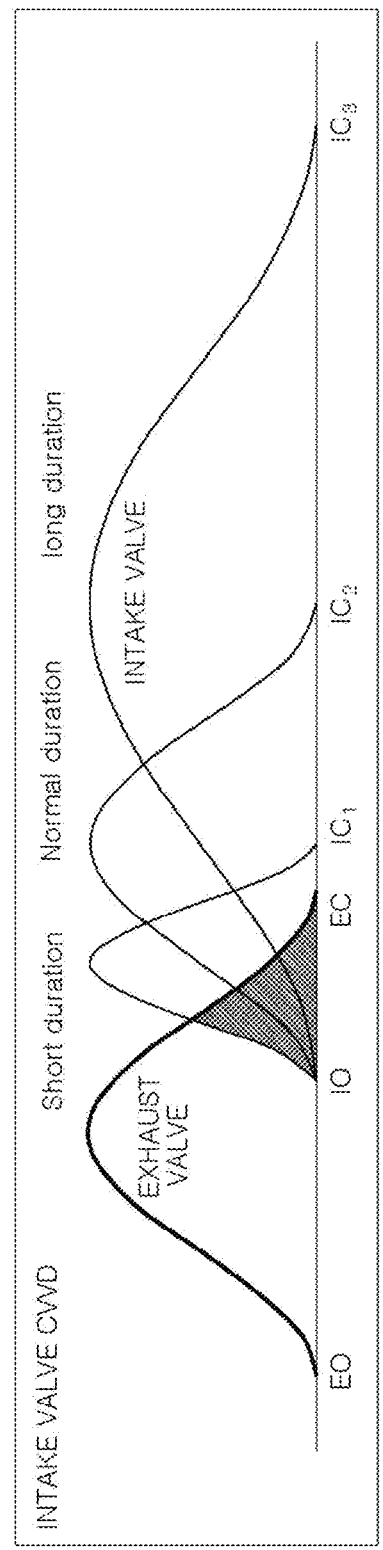
FIGS. 4A and 4B are diagrams illustrating the change in the valve profile when an intake valve and an exhaust valve are changed by using the variable valve duration apparatus, respectively upon the overlap of the valve.

FIG. 4A illustrates the change in the shape of the valve profile when the valve duration of the intake valve is changed by using the variable valve duration apparatus in the state where the valve duration of the exhaust valve is fixed. In FIG. 4A, the X-axis represents the operating angle of the valve and the Y-axis represents the valve lift amount. In FIG. 4A, the closing of the valve is changed ($IC_1$ to $IC_3$) in the state where the opening IO of the intake valve is fixed by using the variable valve duration apparatus. In this case, the valve overlap section is the same, but the effective area where the valve overlap occurs varies as the valve duration of the intake valve is changed.

Figure 4B:
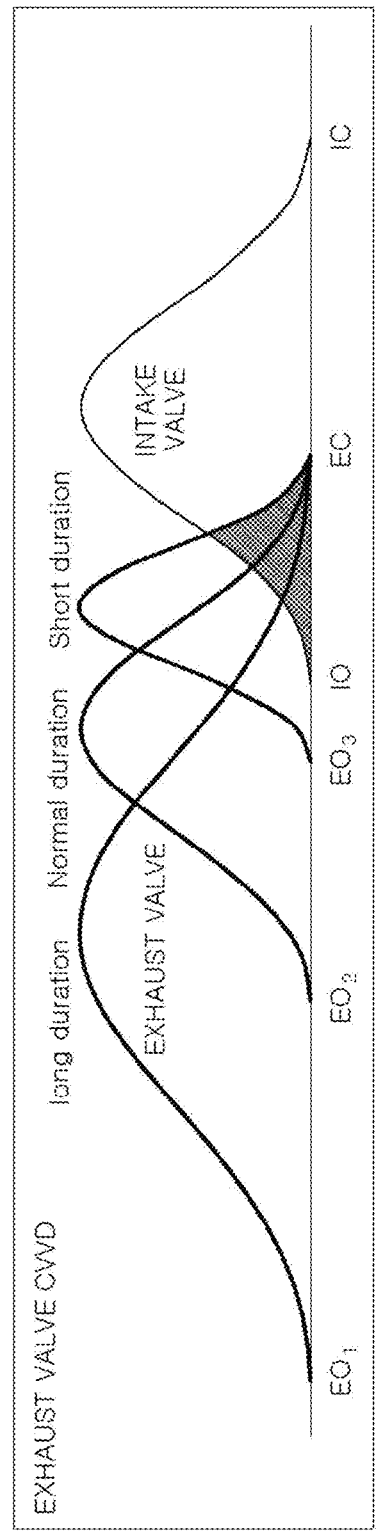

In the example of FIG. 4B, conversely, the valve duration of the intake valve is fixed, and the valve duration of the exhaust valve is changed by advancing or retarding the opening in the state of fixing the closing EC. Even in the example of FIG. 4B as in the example of FIG. 4A, the valve overlap section is the same, but the effective area in which the valve overlap occurs varies as the valve duration of the exhaust valve is changed.

The fact that the effective area made by the valve overlap is changed means that the movement of the flow rate in the valve overlap section is changed. That is, the backflow gas amount is different, and therefore, the air amount filled inside the cylinder finally varies. As illustrated in FIGS. 4A and 4B, when the duration of the intake or exhaust valve becomes great, the effective opening area of the valve becomes small even in the same valve overlap section, such that the flow rate of the backflow gas becomes small.

When such a phenomenon is not reflected, the air charge amount of the cylinder is calculated to be greater than the actual value when the valve duration is great. In this case, the fuel is injected to be smaller than the actual air amount, thereby reducing the performance. Conversely, when the valve duration is small, the air charge amount of the cylinder is calculated to be smaller than the actual value. In this case, the fuel is injected to be greater than the actual air amount, thereby deteriorating the fuel efficiency.

Therefore, when calculating the cylinder charge air amount of the vehicle equipped with the variable valve duration apparatus, such characteristics should be considered. Hereinafter, a method for calculating the cylinder charge air amount considering the above characteristics in the vehicle equipped with the variable valve duration apparatus will be described in detail with reference to FIG. 2.

Figure 2:
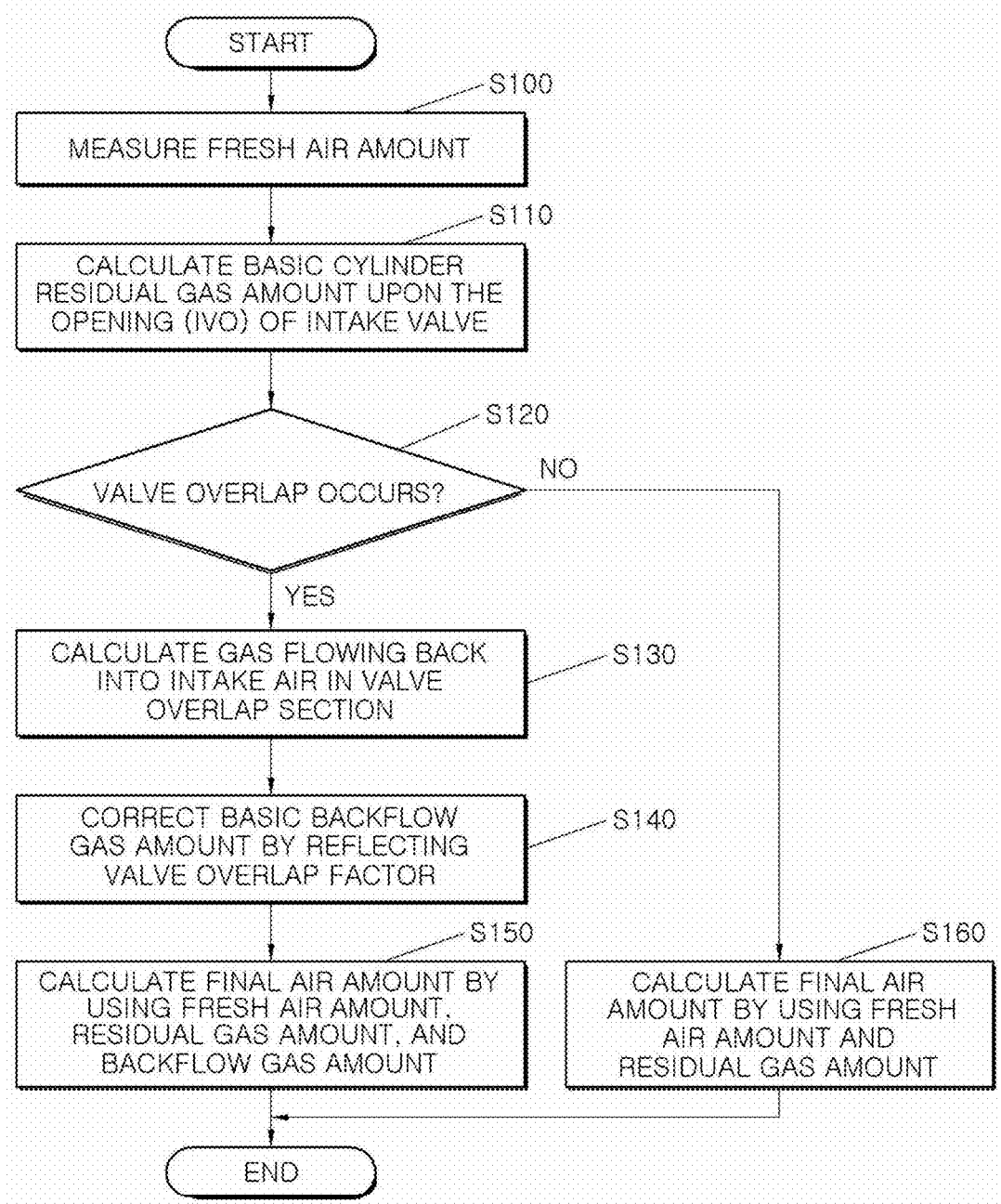
FIG. 2 is a flowchart illustrating a method for calculating the air charge amount of a cylinder, in the method for controlling the air-fuel ratio of the vehicle according to one form of the present disclosure.

FIG. 2 is a flowchart illustrating a method for calculating the cylinder charge air amount in the method for controlling the air-fuel ratio of the vehicle according to the present disclosure.

According to FIG. 2, in step S100, the engine control unit 6 first measures the fresh air amount flowed into from the throttle valve 4. In one form, the fresh air amount may be measured through an air amount sensor (MASS AIR FLOW SENSOR, MAF sensor) installed at the rear end of the throttle valve 4.

Next, in step S110, the engine control unit 6 calculates the basic cylinder residual gas amount $V_{RESIDUAL}$ at the opening IVO of the intake valve 20. The engine control unit 6 calculates the residual gas amount $V_{RESIDUAL}$ remaining inside the cylinder of the engine upon the valve opening of the intake valve, based on the volume, the internal pressure, the exhaust gas temperature, and the like inside the cylinder of the engine. At this time, the volume inside the cylinder means the volume of a combustion chamber in the cylinder upon the opening of the intake valve. Then, the internal pressure of the cylinder may be calculated by using the pressure of a surge tank and the pressure of the exhaust gas measured by a Manifold Absolute Pressure (MAP) Sensor of the intake system. The temperature of the exhaust gas may be measured through a temperature sensor installed in the exhaust system.

Next, in step S120, the engine control unit determines whether the valve overlap has occurred to calculate the basic backflow gas amount S120. The valve overlap means the state where the exhaust valve and the intake valve are both opened because the opening IVO of the intake valve is present before the closing EVC of the exhaust valve. Therefore, it is possible to confirm whether the valve overlap has occurred from the closing EVC of the exhaust valve and the opening IVO of the intake valve.

When the valve overlap has not occurred, the backflow phenomenon of the exhaust gas into the cylinder is not present, such that the engine control unit 6, in step S160, calculates the final cylinder charge air amount by summing the fresh air amount measured in the step S100 with the basic cylinder residual gas amount $V_{RESIDUAL}$ calculated in the step S110.

If it is determined that the valve overlap has occurred, in order to determine the final cylinder charge air amount, the engine control unit 6 calculates a basic backflow gas amount $V_{BACK}$ flowing back to the intake air in the valve overlap section in step S130. The backflow of the exhaust gas occurring upon the valve overlap is caused by a difference between the pressure at the intake side and the pressure at the exhaust side. Then, the behavior of the gas upon backflow is changed according to the temperature of the exhaust gas and the valve overlap period during a predetermined operating angle.

Therefore, the engine control unit 6 may calculate the total amount $V_{BACK}$ of the exhaust gas flowing back to the intake valve by inputting the measured values of the pressure at the intake side and the pressure at the exhaust side, the measured value of the exhaust gas temperature, and the valve overlap period to a predetermined map specifying the relationship between these values and the backflow gas amount. The basic backflow gas amount $V_{BACK}$ at this time is a value related to the basic valve profile when a valve control is not performed by the continuous variable valve duration apparatus 100.

Next, in step S140, the engine control unit 6 corrects the basic backflow gas amount $V_{BACK}$ based on the valve duration that is changed by an operation of the continuous variable valve duration apparatus 100.

As illustrated in FIGS. 4A and 4B, the valve profile of the intake valve (FIG. 4A) or the exhaust valve (FIG. 4B) to be controlled is changed when the continuous variable valve duration apparatus 100 is operated. Herein, the valve profile indicates a change in the valve lift amount according to the operating angle of the valve, and the area inside the valve profile indicates the effective opening area of the corresponding valve.

In FIG. 4A, it is assumed that the valve duration $I_{STANDARD}$ of the intake valve 20 when the valve duration is not controlled by the continuous variable valve duration apparatus 100 is regarded as the closing $IC_2$ from the opening IO of the intake valve. When the closing is increased from $IC_2$ to $IC_3$ in the state of fixing the opening IO of the intake valve 20 by the continuous variable valve duration apparatus 100, the valve duration is increased while maintaining the maximum valve lift amount to change the valve profile.

Therefore, even when the overlap occurs between the same periods IO to EC, the area (effective opening area) of the overlapping portion of the valve profiles of the intake valve 20 and the exhaust valve 30 upon the valve overlap is changed. As a result, the flow rate of the backflow gas upon the valve overlap is also changed. Therefore, the engine control unit 6 corrects the basic backflow gas amount calculated in the S130 based on the valve duration changed by the operation of the continuous variable valve duration apparatus 100.

In one form, for this purpose, the engine control unit 6 calculates a correction factor from the change in the effective opening area when the valve duration is changed by the operation of the continuous variable valve duration apparatus 100, and corrects the basic backflow gas amount $V_{BACK}$ by multiplying the basic backflow gas amount $V_{BACK}$ by the correction factor.

In the above-described example of FIG. 5A, the basic valve profile (IO→$IC_2$) of the intake valve 20 when not controlled by the continuous variable valve duration apparatus 100 is stored in the engine control unit 6 as a predetermined value according to the specification of the valve applied to the vehicle. Therefore, when it is not controlled by the continuous variable valve duration apparatus 100, the overlapping area A1 of the valve profile (IO→$IC_2$) of the intake valve 20 and the profile (EO→EC) of the exhaust valve 30 upon the valve overlap may be determined by the opening IO of the intake valve and the closing EC of the exhaust valve.

Meanwhile, the valve profile (IO→$IC_3$) of the intake valve 20 when controlled by the continuous variable valve duration apparatus 100 becomes a value changing the valve profile (IO→$IC_2$) at a certain rate according to the change in the valve duration. When the changed valve profile (IO→$IC_3$) is obtained, the overlapping area A2 of the valve profile of the intake valve 20 and the profile (EO→EC) of the exhaust valve 30 when controlled by the continuous variable valve duration apparatus 100 may be obtained by using the corresponding valve profile (IO→$IC_3$) and the opening IO of the intake valve and the closing EC of the exhaust valve.

As described above, when the valve duration increases, the effective opening area reduces in the same valve overlap section, and conversely, when the valve duration reduces, the effective opening area increases in the same valve overlap section. Therefore, the correction factor for reflecting this may be calculated by a ratio of the overlapping area A1 of the valve profile (IO→$IC_2$) of the intake valve 20 and the profile (EO→EC) of the exhaust valve 30 when not controlled by the continuous variable valve duration apparatus 100 and the overlapping area A2 of the valve profile of the intake valve 20 and the profile (EO→EC) of the exhaust valve 30 when controlled by continuous variable valve duration apparatus 100.

As described above, the valve profile (IO→$IC_2$) upon the valve control by the continuous variable valve duration apparatus 100 is determined by the change in the valve duration.

Therefore, the valve profile (IO→$IC_2$) upon the valve control by the continuous variable valve duration apparatus 100 may be obtained by a predetermined function related therewith by obtaining the Most Opening Position (MOP)

and the valve closing $IC_2$ of the valve controlled by the continuous variable valve duration apparatus 100.

In addition, in another form, the valve profile ($IO \rightarrow IC_2$) may also be obtained by a predetermined function related therewith by obtaining the Most Opening Position (MOP) and the valve opening IO of the valve controlled by the continuous variable valve duration apparatus 100.

In still another form, the valve profile ($IO \rightarrow IC_2$) may also be obtained by a predetermined function related therewith by obtaining the opening IO and the closing $IC_2$ of the valve controlled by the continuous variable valve duration apparatus 100.

Alternatively, the valve profile ($IO \rightarrow IC_2$) may also be obtained therefrom by obtained the valve duration and the Most Opening Position (MOP) of the valve controlled by the continuous variable valve duration apparatus 100.

Alternatively, the valve profile ($IO \rightarrow IC_2$) is defined by a function of the valve duration alone of the valve controlled by the continuous variable valve duration apparatus 100, and may also be obtained therefrom by obtaining a value of the valve duration.

Based on the valve profile obtained by the above method, the engine control unit 6 determines the correction factor, and corrects the basic backflow gas amount $V_{BACK}$ by multiplying the correction factor by the basic backflow gas amount $V_{BACK}$ in step S140.

Next, in step S150, the engine control unit 6 calculates the final cylinder charge air amount by summing the fresh air amount, the corrected basic backflow gas amount $V_{BACK}$, and the basic cylinder residual gas amount $V_{RESIDUAL}$ S150.

Hereinafter, a method for calculating the purge gas flow rate and the amount of the fuel component in the purge gas when the active purge system is driven in the S20 and the S40 in FIG. 1 will be described in more detail with reference to FIGS. 5 to 7.

FIG. 5 is a flowchart illustrating a method for calculating the purge gas flow rate and the amount of fuel component in the purge gas when the active purge system is driven.

As illustrated in FIG. 5, when the traveling state of the vehicle or the like satisfies the purge enabling state, the engine control unit 6 determines a target purge flow rate S200. In one form, the target purge flow rate may be determined by comprehensively considering the concentration and the flow rate of the purge gas calculated in the previous step, the operating state of the vehicle, the intake air amount and the supply fuel amount into the engine, and the like.

When the target purge flow rate is determined, the engine control unit 6 determines a target RPM of the purge pump 16 suitable for the target purge flow rate S210, and controls the purge pump 16 to be driven at the determined target RPM S220.

The engine control unit 6 determines that the environment, which may accurately calculate the purge gas flow rate and the purge concentration when a certain time has elapsed since the operation of the purge pump 16 started, or a difference between the target RPM of the purge pump 16 and the current RPM of the purge pump 16 has reached within a predetermined range, has been established to perform calculating the purge gas flow rate S230 and calculating the purge concentration S240.

In the S230, the engine control unit 6 uses the difference values of the pressures at the front and rear ends of the purge pump 16 measured by the pressure sensors 15, 17, respectively.

Figure 6:
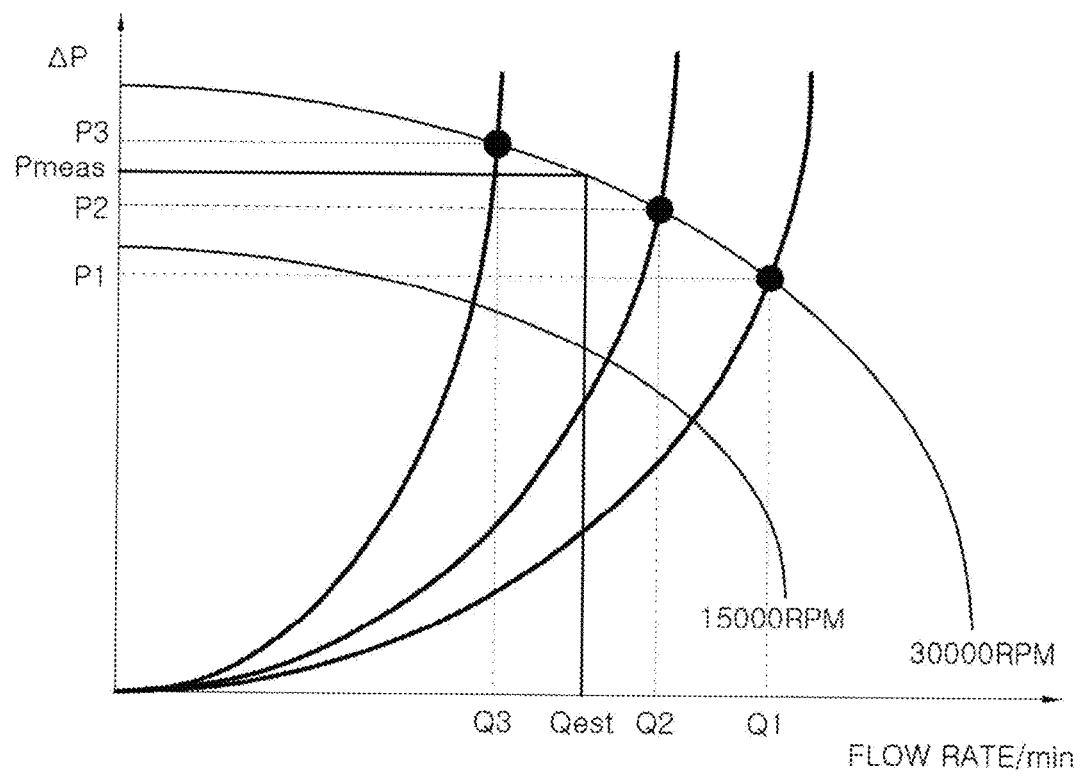
FIG. 6 is a graph illustrating the relationship between the purge gas flow rate and the pressure difference between the front and rear ends of the purge pump.

FIG. 6 illustrates the relationship between the pressure difference of the front and rear ends of the purge pump 16 and the purge flow rate Q in the case where the drive RPM of the purge pump 16 is 15000 RPM and 30000 RPM, respectively. If the relationship between the pressure difference of the front and rear ends of the purge pump 16 and the purge flow rate Q corresponding to each RPM of the purge pump 16 is set as a map, the engine control unit 6 may calculate the pressure values at the front and rear ends of the purge pump 16 measured by the pressure sensor 17 and the purge gas flow rate $Q_{est}$ by using the map.

In the S240, the engine control unit 6 determines the purge concentration by using the relationship between the RPM of the purge pump 16 and the pressure value at the rear end of the purge pump 16.

As is well illustrated in the energy equation of the following Equation 1, the pressure difference $\Delta P_{APP}$ at both ends of the purge pump is proportional to the air density $\rho$.

$$\Delta p_{APP} = K \frac{\rho}{2}(2\pi rf)^2 \quad \langle \text{Equation 1} \rangle$$

Then, the purge gas containing the fuel component (hydrocarbon) becomes denser than pure air. Therefore, in particular, when the purge pump 16 is operated in the state where the purge valve 18 has been closed, the pressure at the rear end of the purge pump 16 in the purge gas containing hydrocarbon is higher than the pressure at the rear end of the purge pump 16 in the pure air. Therefore, the pressure value at the rear end of the purge pump 16 and the purge concentration have a constant relationship.

Figure 7:
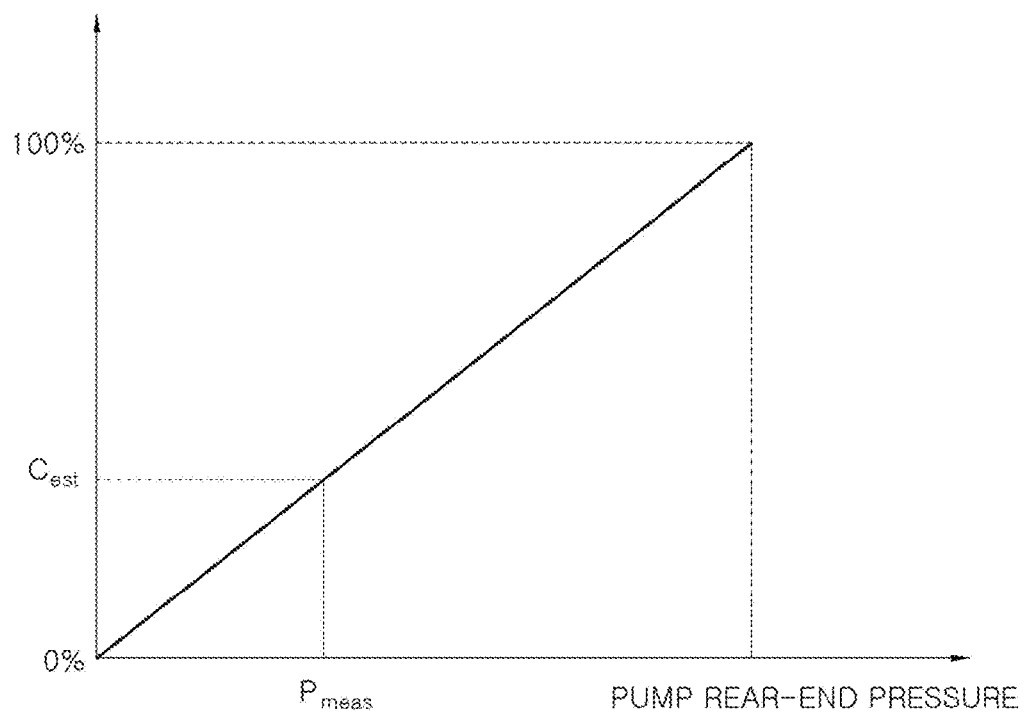
FIG. 7 is a graph illustrating the relationship between the purge concentration and the rear-end pressure of the purge pump.

FIG. 7 is a graph illustrating the relationship between the purge concentration and the pressure at the rear end of the purge pump in the purge pump driven at a specific rpm. As illustrated in FIG. 7, the pressure at the rear end of the purge pump 16 and the purge concentration have a linear relationship with respect to the specific RPM of the purge pump 16. Therefore, by using the linear relationship, it is possible to estimate the purge concentration $C_{est}$ when the pressure $P_{meas}$ at the rear end of the purge pump 16 driven at a predetermined RPM is known. If the relationship between the pressure $P_{meas}$ at the rear end of the purge pump 16 and the purge concentration $C_{est}$ corresponding to each RPM of the purge pump 16 is set as a map, the engine control unit 6 may calculate the pressure value at the rear end of the purge pump 16 measured by the pressure sensor 17 and the purge concentration by using the map.

Meanwhile, when the purge valve 18 has been closed, the change in the pressure at the rear end of the purge pump 16 is much greater than the change in the pressure at the rear end of the purge pump 16 when the purge valve 18 has been opened. Therefore, in order to accurately measure the purge concentration, it is desired to drive the purge pump 16 in the state where the purge valve 18 has been closed.

When the purge gas flow rate is calculated in the S230 and the purge concentration is calculated in the S240, the mass of the fuel component contained in the purge gas may be calculated by using them S250. Since the purge concentration calculated above is a volume ratio, the density of the purge gas may be determined by the following Equation 2 if the purge concentration is known.

$$\rho_{bas} = \rho_{HC} \times \left(\frac{C}{100}\right) \quad \langle \text{Equation 2} \rangle$$

where, $\rho_{bas}$: HC density in the purge gas, $\rho_{act}$: a reference density of HC, c: purge concentration (HC concentration)

Meanwhile, since a value of the HC density in the purge gas is changed according to the altitude of the vehicle and the external air temperature of the vehicle, it is desired to correct this portion.

In addition, in order to calculate the mass of the fuel component contained in the purge gas more accurately, the final HC density value $\rho_{act}$ may be calculated by correcting a value of the HC density $\rho_{bas}$ in the purge gas by using the following Equation 3 according to the altitude of the vehicle and the external air temperature of the vehicle.

$$\rho_{act} = \rho_{bas} * \frac{P}{1\,\text{atm}} * \frac{273.15}{(273.15 + temp)} \qquad \langle\text{Equation 3}\rangle$$

where, P: atmospheric pressure according to the altitude of the vehicle, temp: external air temperature When the final HC density value $p_{act}$ is calculated, the mass M of the fuel component in the purge gas may be calculated by multiplying this value by the purge gas flow rate $Q_{est}$ as in the following Equation 4 S250.

$$M = Qest \times \rho_{HC} \times \left(\frac{C}{100}\right) \times \frac{P}{1\,\text{atm}} \times \frac{273.15}{(273.15 + temp)} \qquad \langle\text{Equation 4}\rangle$$

Meanwhile, since the purge passage 22 to which the purge gas is supplied from the purge pump 16 to the intake manifold 5 is long, the time until the purge gas discharged from the purge pump 16 reaches the intake manifold 5 is delayed. Therefore, even if the purge concentration is accurately calculated by the purge concentration calculation control method illustrated in FIG. 5, it is not easy to estimate the flow-in time point at which the gas flowing into the intake manifold 5 through the purge passage 22 and the concentration at that time.

Therefore, the present disclosure determines the concentration of the purge gas flowing into the intake system at a specific time point by using the diffusion/delay model of the purge gas until being discharged by the purge pump 16 and flowing into the intake manifold 5 of the engine through the purge passage 22. Hereinafter, a method for determining the flow rate and the concentration of the purge gas using the diffusion/delay model of the purge gas will be described in detail with reference to FIGS. 8A to 8D.

FIGS. 8A to 8D are diagrams for explaining a diffusion/delay model of the purge gas used in the control method according to the present disclosure and a delay diffusion estimation of the purge gas using the same.

Figure 8A:
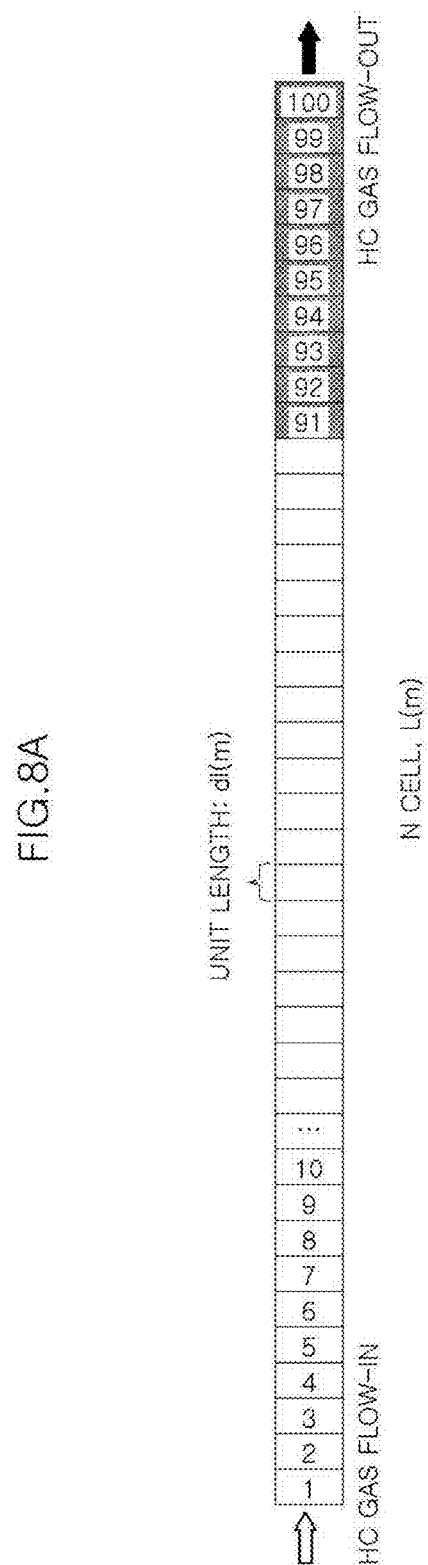

As illustrated in FIG. 8A, the diffusion/delay model of the purge gas has a buffer composed of a predetermined number (N, 100 in this example) of cells. Each cell is provided by extending in the longitudinal direction thereof, and the entire cell represents the purge passage 22. Therefore, the total length of the buffer represents the length L of the purge passage, and the unit length d1 of one cell constituting N cells of the buffer is a value (L/M) obtained by dividing the total length L by the number N of cells.

Figure 8B:
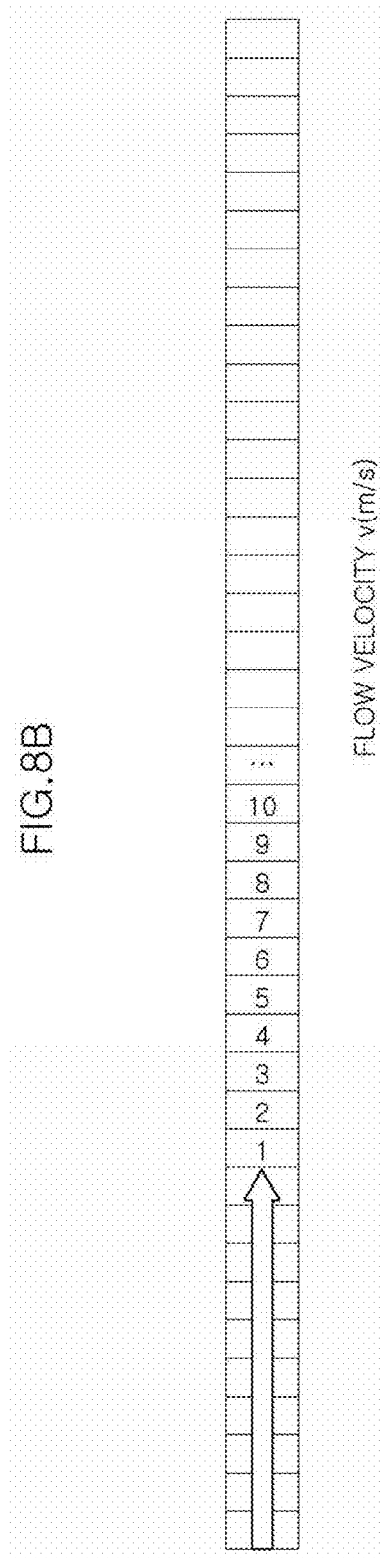

As illustrated in FIG. 8A, the first cell 1 is extruded by the purge pump 16 and becomes an inlet through which the purge gas whose flow rate is controlled by the purge valve 18 flows into the purge passage. Then, the last cell 100 becomes an outlet of the purge passage 22 out which the purge gas flows to the intake manifold 5. That is, the purge gas flows into the first cell 1, and flows out to the last cell 100. At this time, as illustrated in FIG. 8B, it is assumed that the flow velocity v inside the purge passage 22 is constant, and that the flowed-in purge gas moves toward the outlet at a velocity corresponding to the corresponding flow velocity v. That is, it is assumed that there is no compression of the purge gas in the purge passage 22. The flow velocity v at this time is a value $(L/t_{delay})$ obtained by dividing the length of the purge passage 22 by the delay time $t_{delay}$ when the purge gas reaches from the inlet to the outlet.

As illustrated in FIG. 8B, since the purge gas continuously moves in the purge passage 22, one cell is moved by a predetermined number of cells for a predetermined time.

That is, when the sampling time in the model is dT, the distance $d_{flow}$ moving during the sampling time is a value obtained by multiplying the flow velocity v by the sampling time dT, that is, $L/t_{delay} \times dT$, and therefore, the number of cells moving during the sampling time becomes a value obtained by dividing $L/t_{delay} \times dT$ by the length per cell, and therefore becomes $dT \times N/t_{delay}$. At this time, since the number of cells is an integer, the value after the decimal point is discarded becomes the number of cells moving during the sampling time.

The delay diffusion estimation procedure of the purge gas using the diffusion/delay model of the purge gas illustrated in FIG. 8A may be performed in the following order.

A form of the diffusion/delay model of the purge gas in FIG. 8A has the buffer of 100 cells. Then, the delay time is obtained by using the information related to the flow velocity of the purge gas such as the purge gas flow rate Q, and calculates the number of cells moving during the sampling time dT by using a predetermined sampling time dT and a predetermined number of cells. In this example, the number of cells moving during the sampling time dT is ten. Therefore, the last ten cells deeply colored in FIG. 8A represent the purge gas moving to the intake manifold 10 during the sampling time dT.

When the first purge gas flows into the purge passage 22, the purge concentration and the flow rate at the corresponding time point are allocated to the buffer corresponding to the cell 10 of the previously determined number of cells (ten in this example) from the first cell 1. At this time, all 10 cells are allocated the same value.

Then, as illustrated in FIG. 8B, all the data inside the buffer are moved by the determined number of cells toward the outlet per a sampling cycle. At this time, the average value of the purge gas concentrations stored in the last ten cells deeply colored in FIG. 8A becomes the concentration of the purge gas flowing into the intake manifold 5.

Meanwhile, as illustrated in FIG. 8C, when a fresh purge gas is continuously flowed therein, the flow rate and the concentration of the purge gas flowing into the buffer corresponding to the cells of the determined number of cells from the first cell are newly allocated. Subsequently, when the purge gas flows into the purge passage 22, the procedures of FIGS. 8B and 8C are repeatedly performed. Meanwhile, when the purge gas flow rate is changed in the procedure, the number of cells moving during the sampling time dT is recalculated to move the cell (update the value stored in the buffer of each cell).

Meanwhile, when the flow-in of the fresh purge gas is stopped as illustrated in FIG. 8D, the cells during the sampling period in which the flow-in of the purge gas has been stopped become empty buffers to which the purge concentration is not allocated. Then, at this time, the concentration of the purge gas flowing into the intake manifold 5 is calculated by multiplying a ratio of the number of cells into which the purge gas concentration has been input to the buffer until now by the average value of the purge gas concentration allocated to the cells. In the example of FIG. 8D, since the purge gas concentration is allocated to 90 cells, the purge concentration at this time becomes 90% of the average value of the purge concentration stored in the cell.

By using the above-described diffusion/delay model of the purge gas, it is possible to calculate the concentration of the purge gas when the purge gas reaches the intake manifold 5 in a simple method. Therefore, it is possible to calculate the total fuel amount supplied to the engine more accurately by using the calculated purge gas concentration.

The forms disclosed the specification and the accompanying drawings are only used for easily explaining the technical spirit of the present disclosure, and are not used for limiting the scope of the present disclosure recited in the claims, and therefore, it is to be understood by those skilled in the art that various modifications and equivalent other forms therefrom may be made.

What is claimed is:

1. A method for controlling an air-fuel ratio of a vehicle, where the vehicle includes an active purge system for purging a fuel evaporation gas by using a purge pump, and a variable valve duration apparatus, the method comprising:
changing, by the variable valve duration apparatus, a valve duration of an intake valve or an exhaust valve of an engine of the vehicle;
determining, by a controller, that a valve overlap has occurred based on an opening timing of the intake valve and a closing timing of the exhaust valve;
in response to determining that the valve overlap has occurred, calculating a backflow gas amount flowing back into a cylinder of the engine by correcting a basic backflow gas amount based on an exhaust pressure, an intake pressure, a temperature of exhaust gas, and a period of the valve overlap changed by the variable valve duration apparatus;
calculating, by the controller, an air amount charged in the cylinder of the engine based on a fresh air amount flowed into from outside through a throttle valve of the engine, a residual air amount remaining inside the cylinder of the engine upon opening of the intake valve, and the backflow gas amount flowing back into the cylinder, wherein the backflow gas amount is calculated further based on the valve duration controlled by the variable valve duration apparatus;
calculating, by the controller, a purge gas flow rate of purge gas supplied to an intake manifold of the engine when the active purge system is operated;
calculating, by the controller, a final air amount by correcting the calculated air amount charged in the cylinder with the calculated purge gas flow rate;
calculating, by the controller, an amount of a fuel component contained in the purge gas when the active purge system is operated;
calculating, by the controller, a final fuel amount by correcting a fuel amount injected by a fuel injection device with the calculated amount of the fuel component contained in the purge gas; and
controlling, by the controller, an air-fuel ratio of a mixture so as to satisfy a target air-fuel ratio based on the final air amount and the final fuel amount.

2. The method for controlling the air-fuel ratio of the vehicle of claim 1,
wherein the purge gas flow rate is calculated by using revolutions per minute (RPM) of the purge pump and a pressure difference between at a first end and a second end of the purge pump.

3. The method for controlling the air-fuel ratio of the vehicle of claim 1,
wherein the calculating the amount of the fuel component contained in the purge gas comprises:
calculating a concentration of the purge gas by using revolutions per minute (RPM) of the purge pump and a pressure at a rear end of the purge pump;
calculating a density of the fuel component in the purge gas by using the calculated concentration of the purge gas; and
calculating a mass of the fuel component contained in the purge gas by using the density of the fuel component and the purge gas flow rate.

4. The method for controlling the air-fuel ratio of the vehicle of claim 3,
wherein calculating the concentration of the purge gas is performed when a purge valve for opening and closing a purge passage has been closed.

5. The method for controlling the air-fuel ratio of the vehicle of claim 3,
wherein calculating the amount of the fuel component contained in the purge gas further comprises compensating the calculated density of the fuel component based on an external air temperature and an altitude of the vehicle.

6. The method for controlling the air-fuel ratio of the vehicle of claim 3, further comprising: determining a flow-in-time at which the purge gas flows into the intake manifold through a purge passage and a concentration of the purge gas when the purge gas reaches the intake manifold by using a diffusion/delay model,
wherein the diffusion/delay model has a buffer including a predetermined number of cells which represent the purge passage, and the concentration of the purge gas and a flow rate of the purge gas at a corresponding time point are allocated to the buffer corresponding to a cell of the predetermined number of cells.

7. The method for controlling the air-fuel ratio of the vehicle of claim 1,
wherein in correcting the basic backflow gas amount, the period of the valve overlap is determined by a valve profile of the intake valve and a valve profile of the exhaust valve, and the valve profiles are determined based on a Most Opening Position (MOP) and a valve closing of the intake valve or the exhaust valve controlled by the variable valve duration apparatus.

8. The method for controlling the air-fuel ratio of the vehicle of claim 1,
wherein in correcting the basic backflow gas amount,
the valve overlap is determined by a valve profile of the intake valve and a valve profile of the exhaust valve, and the valve profiles are determined based on a Most Opening Position (MOP) and the opening timing of the intake valve or the exhaust valve controlled by the variable valve duration apparatus.

9. The method for controlling the air-fuel ratio of the vehicle of claim 1,
wherein in correcting the basic backflow gas amount,
the valve overlap is determined by a valve profile of the intake valve and a valve profile of the exhaust valve, and the valve profiles are determined based on the opening timing and the closing timing of the intake valve or the exhaust valve controlled by the variable valve duration apparatus.

10. The method for controlling the air-fuel ratio of the vehicle of claim 1,
wherein in correcting the basic backflow gas amount,
the valve overlap is determined by a valve profile of the intake valve and a valve profile of the exhaust valve, and the valve profiles are determined based on the valve duration and a Most Opening Position (MOP) of the intake valve or the exhaust valve controlled by the variable valve duration apparatus.

11. The method for controlling the air-fuel ratio of the vehicle of claim 1,
wherein in correcting the basic backflow gas amount, the valve overlap is determined by a valve profile of the intake valve and a valve profile of the exhaust valve, and the valve profiles are determined by a function of the valve duration of the intake valve or the exhaust valve controlled by the variable valve duration apparatus.

12. The method for controlling the air-fuel ratio of the vehicle of claim 1, further comprising calculating the final air amount by correcting the air amount corrected by the flow rate of the purge gas with a flow rate of exhaust gas recirculated through an exhaust gas recirculation system.

* * * * *